June 23, 1942.    C. E. McMANUS ET AL    2,287,388
CONTAINER CLOSURE
Filed Jan. 8, 1942
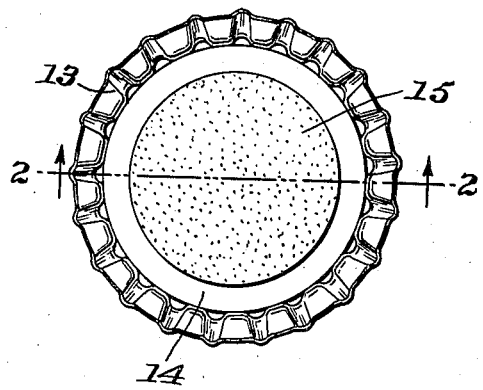
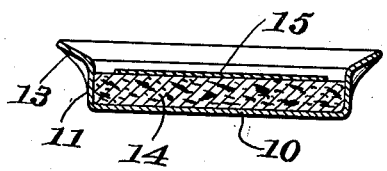
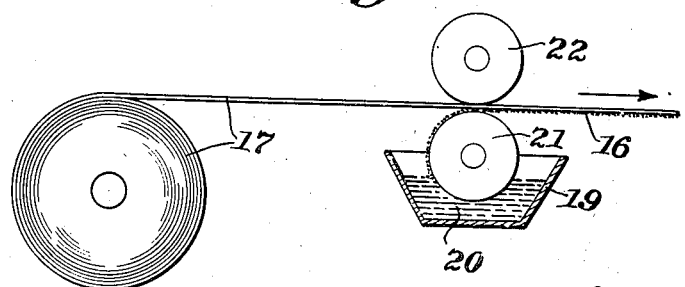
Inventors:
Charles E. McManus,
Giles B. Cooke, &
Victor H. Ryan,
By Cushman Darby & Cushman
Attorneys.

Patented June 23, 1942

2,287,388

UNITED STATES PATENT OFFICE 2,287,388

CONTAINER CLOSURE

Charles E. McManus, Spring Lake, N. J., and Giles B. Cooke and Victor A. Ryan, Baltimore, Md., assignors to Crown Cork & Seal Company, Inc., Baltimore, Md., a corporation of New York Application January 8, 1942, Serial No. 426,074

2 Claims. (Cl. 215—39)

This invention relates to container closures and particularly to closures of the center spot type. Closures of this type comprise a metallic shell having a crimped skirt, a cushion liner of suitable material such as natural or composition cork, and a facing layer of smaller diameter than the cushion disc adhesively secured to the disc to cover the central portion thereof and to leave exposed an annular marginal portion thereof, adapted to cooperate with the sealing lip of the container to provide a tight seal. The center spot constitutes a facing which prevents the contents of the bottle from coming in contact with the cushion liner.

The invention further relates to an improved closure facing or spotting material including chlorinated rubber and method of producing the same. The material is characterized by resistance to acids and alkalies such as are encountered in the packaging of foods, beverages and pharmaceuticals and relatively high temperatures such as are encountered in pasteurization and closure manufacture, and is relatively tasteless and odorless and is not affected by moisture. It may be used in the customary high speed machinery for forming and applying spots from strip material.

We are aware that it has been proposed heretofore to laminate sheet material formed from rubber hydrochloride with paper or other material to form closure facings. Such facings are objectionable for various reasons, including expense of manufacture, tendency of the layers to separate, and unsatisfactory resistance of the hydrochloride film to vapors and liquids. Furthermore, the laminated character of the product has proved objectionable in the center spotting operations involving the punching and depositing of the spots under heat and pressure.

We are also aware that it has been proposed to coat paper, for example, with rubber hydrochloride solution in the manufacture of various articles, such as containers and milk bottle caps, and as typical of such suggestions, we refer to the patent to Calvert, No. 1,989,632, granted January 29, 1935. Such solution is not satisfactory for closures as used in the sealing of carbonated beverages, e. g. beer and so-called "soft drinks," which are ordinarily provided with a facing of the center spot type applied to each individual cap, or to the facing disc thereof, under heat and pressure which are required to obtain an initial union of the spot and cushion liner with the spot properly centered. Facings for this purpose must be highly resistant to liquid and vapor, and also should be resistant to acids and alkalies.

Moreover, due to the necessity for preserving a continuous unbroken film under the distorting stresses to which the spots are subjected during use, the film must be flexible, tough and strong. In order to be suitably resistant to vapors and liquids, the solution and resulting film must have a sufficiently high percentage of rubber solids and yet, to form a regular continuous film, the content of these rubber solids must be accurately controlled. Moreover, we have found that a problem exists in rendering a chlorinated rubber film suitably resistant to liquids, particularly under the temperature variations to which the facings are subjected during application and in use.

The present invention is based upon the discovery that in order to provide a satisfactory film for facing closures, particularly of the type used to seal high pressure liquids containing carbon dioxide gas, the chlorinated rubber content of the facing film must be obtained from a chlorinated rubber of relatively high solubility. By high solubility, we mean that the rubber should be capable of forming a solution of at least 45 percent by weight in solvent which is compatible with the backing material and useful as a solvent with the added ingredients. Suitable typical solvents are toluol xylol, ethylene dichloride, "Solvesso" No. 2 and No. 3. We have found that there should be provided a solution having a chlorinated rubber content of at least 10%, and preferably substantially higher, for example in the neighborhood of 16%, but it may be as high as 20% and that the total non-volatile content should be of the order of at least 20% and preferably as high as from 25% to 45%. It is also based upon the discovery that a film of this chlorinated rubber of relatively high solubility, may have imparted thereto sufficient strength if there is combined therewith an agent or agents which will increase the resistance of the film to heat and pressure such as is encountered in "spotting" and during pasteurization. We have found that relatively hard resins or gums may be employed for this purpose such as ester gum, "Staybelite" ester No. 10 which is a glycerol ester of hydrogenated rosin, synthetic resins such as urea formaldehyde resins, phenol formaldehyde resins, alkyd resins modified by drying oil fatty acids such as those derived from linseed oil or other drying oils, natural resins such as dammar gum and East India gum or mixtures of such resins and gums, which are all relatively hard resins.

We have also found that in order to prevent the coated paper from imparting taste to the beverage, the liquid resistance of the film formed from the solution should be enhanced by including a plasticizer among which may be mentioned as satisfactory the drying oil types namely, linseed, tung or perilla oils, relatively soft resins such as alkyd resins modified by non-drying oils or semi-drying oils, e. g., raw castor oil and dehydrated castor oil, "Hercolyn" which is the methyl ester of rosin, glycol esters of hydrogenated rosin such as "Staybelite" esters No. 2 and No. 3, and polyvinyl acetate, and suitable combinations of any thereof; such plasticizers are superior for this purpose to non-drying oils or chemical plasticizers. The plasticizers moreover have the further function of plasticizing the relatively hard resins referred to above in the final film so that these strengthening agents can be utilized with the chlorinated rubber to produce a film having high tensile strength which at the same time is flexible and free from cracking or peeling. For this latter purpose also, chemical plasticizers such as diamyl or dibutyl phthalate or mixtures thereof or some compatible ester of phthalic acid or oil plasticizers such as raw castor oil may be used, particularly where the facing need be merely vapor or gas resistant. In preparing the solution, it is desirable to control the viscosity so that the film forming characteristics are such as to permit the formation of a film of required character on the particular material backing being employed, and when forming a film on paper, we prefer a viscosity which does not exceed one thousand seconds at 100° F. as measured on a Stormer viscosimeter equipped with a 150 gram counterweight.

A film formed from a solution of chlorinated rubber of relatively high solubility and having a rubber solid content substantially in excess of approximately 10% and strengthened by an agent such as a hard gum or a hard resin, or a mixture of the two, and preferably enhanced in water resistance by a suitable plasticizer of the character described, forms a closure facing center spot for a cap of the crown type, suitable for the wide variety of uses for which caps of this type are intended.

A particular object of the invention is to improve the resistance and sealing qualities of caps by the use of a spotting material comprising a backing or foundation layer of paper having on one side a continuous coating or film of chlorinated rubber which is present substantially completely as a surface layer of uniform thickness. In this manner, a coating offering optimum resistance to the contents, and providing improved sealing is obtained, as distinguished from coating films which exhibit irregularities, spottiness and other objections due to lack of continuity and uniformity.

It is an important feature of the present invention that the chlorinated rubber film is deposited on the surface of the backing from a solution which possesses a very low coefficient of penetration and a low interfacial tension. In producing a continuous uniform film, it is very necessary that the coating solution has a low interfacial tension which permits a ready flow over the surface that is being coated. This contributes very materially to the production of a continuous chlorinated rubber facing layer of uniform thickness. The facing layer is firmly adherent and is characterized by flexibility and compressibility, and a hardness which renders the facing abrasion resistant and tough. In some cases, as where a somewhat absorbent paper backing is used, the backing is impregnated with a composition compatible with the chlorinated rubber film and which will prevent penetration of the paper by the rubber solution thereby assuring that the latter will be present as a surface which is continuous and of uniform thickness.

Another object of the invention is to provide a solution including agents which on drying impart to the film a hardness, a glossy appearance, smoothness, flexibility and water and moisture resistance. Moreover, the film firmly and continuously adheres to the backing and does not crack or peel in use under the high sealing pressures employed, for instance, with crown caps.

In carrying out the present invention, we utilize any chlorinated rubber which meets the aforesaid requirements and is commercially available, for example, "Hercules, 67% chlorine, 1000 centipoise grade, high viscosity" as described in "Chlorinated Rubber Handbook" of Hercules Powder Company, Wilmington, Delaware, copyright 1938. The chlorinated rubber is dissolved in a solvent containing as high as 90% aromatics such as Union Oil Company solvent No. 30 or "Solvesso No. 2" of Standard Oil Company of New Jersey which contains a mixture of toluene and xylene and to which we prefer to add about 10 percent of xylol. Solution is preferably effected in a slowly rotating mixer. To the solution is added a material which will aid in producing a hard and glossy transparent film such as a hard gum or resin, namely, ester gum, "Staybelite" ester No. 10 which is a glycerol ester of hydrogenated rosin, synthetic resins such as urea formaldehyde resins, phenol formaldehyde resins, alkyd resins modified by drying oil fatty acids such as linseed oil, natural resins such as dammar gum and East India gum or mixtures of such resins and gums, which are all relatively hard resins. Also, there is added paraffin or any other suitable wax having a melting point preferably of at least 140° F. thereby to enhance water and moisture resistance and flexibility and promote smoothness, and a plasticizer of a character which will be resistant to vapor and gases and/or liquids and impart flexibility. Any plasticizer compatible with chlorinated rubber and which is odorless, tasteless and non-toxic may be used. Chemical plasticizers such diamyl or dibutyl phthalate or mixtures thereof or some compatible ester of phthalic acid or oil plasticizers such as raw castor oil may be used where the facing need be merely vapor or gas resistant. Where the lining must be resistant to both vapor and liquid, an oil plasticizer of the drying type, for instance, one including bodied drying oils, e. g., perilla oil, tung oil or linseed oil with suitable varnish driers may be used, or the plasticizer may be a soft alkyd resin modified by a non-drying or semi-drying oil.

The term "hard resin" as used in the specification is intended to cover resins and gums which have a sharp melting range, i. e., are not appreciably softened by heating until the temperature approaches their melting range. By the term "soft resin" used in the specification is meant resins and gums which have a wide melting range, i. e., tend to soften immediately upon application of heat and to increase in softness as the heating continues until they are completely liquified. Stated another way, in the case of a hard resin, the ball and ring drop test shows a deviation of from 2 to 10° C. from the melting point whereas in the case of a soft resin, which has no definite melting point, the ball and ring drop test shows differences of from 50 to 125° C. from the temperature at which the resin is completely liquid.

All of the ingredients are slowly mixed in a tumbling barrel or rotary mixer and a solution is prepared containing substantially 25 to 45% of non-volatile constituents or solids with the remainder solvent. The exact ratio of solids to solvent for the best coating is critical and is varied depending on the viscosity of the solution desired, the speed of the coating roll, and the desired thickness of the film. A coating varnish having substantially 35% solids is very satisfactory, but in special cases we may prefer a higher percentage to give a thicker film, while in other cases it may be desired to employ a thinner varnish. In general, the film thickness need not be more than 0.0005 inch thick but may be varied between .0002 and .0015, since within this range it will be, as is desirable, sufficiently thin to retain for the facing the identity of the paper backing as a sealing means.

A relatively inexpensive paper backing such as kraft or "drab" express paper is employed. Preferably, the backing is first rendered waterproof and resistant to penetration by the chlorinated rubber solution, as by impregnating the same with a readily penetrating varnish compatible with the facing solution, i. e., one capable of firmly adhering, chemically bonding and assuring optimum spreading of the same, so as to form a continuous, uniform surface film. The impregnating varnish may be of any suitable type, but preferably is one which enhances flexibility of and imparts water resistance to the backing. Thus, a varnish which includes a drying oil, for example, bodied linseed oil in a relatively cheap hydrocarbon solvent such as "Varnolene" or high test gasoline with an appropriate amount of suitable drier is satisfactory. In some cases, the paper backing employed is of sufficient flexibility and waterproofness as to not require impregnation, and likewise the density and surface character of the paper resists any abnormal penetration assuring a smooth coating of uniform thickness. The advantage of the preliminary impregnation of the paper to waterproof the same is that it permits the use of relatively thin films, since individual paper fibres which might accidentally project through such films will, if waterproofed, not impair the utility of the films for facing and spotting purposes by inducting the liquid into the paper backing. Moreover, the use of a compatible impregnant of the character described enhances the adhesive union of the chlorinated rubber and the paper, the impregnant serving as a bonding medium to chemically bond the film to the paper.

The paper, having been impregnated so that it will be flexibilized and rendered relatively waterproof and substantially non-absorptive to the coating solution, is festooned to polymerize the oil and dry the impregnant in the paper. The chlorinated rubber solution is then applied in any suitable coating machine to form a continuous surface film of required and uniform thickness, and the coated paper is festooned to dry and unite the coating.

In the accompanying drawing, we have illustrated the invention as applied to crown caps and spotting material therefor, but it is to be understood that the invention is useful in connection with other types of caps, for example, those which require overall liners.

In the drawing:

Figure 1 is a bottom plan view of a cap;

Figure 2 is a sectional view of the same;

Figure 3 is a sectional view of the liner material showing the facing layer as a continuous surface film of uniform thickness;

Figure 4 is an enlarged sectional view of the liner material showing the backing impregnated with a flexibilizing water-resistant agent; and Figure 5 is a view showing one means by which the paper backing is coated with the facing solution to provide a resistant sealing film which is substantially entirely on the surface of the backing and is continuous and of uniform thickness.

Figures 1 and 2 illustrate, for example, a crown cap comprising a top 10 and a skirt 11 provided with the usual crimps 13. Within the cap and adhered to the bottom is a liner 14 of natural or composition cork or any suitable cushion material. Adhesively united to said cushion liner by any suitable adhesive is a center spot 15 made according to this invention. The facing may, of course, be one of the "overall" type which completely covers the cushion liner.

Referring to Figure 3, I have shown the resistant, sealing, chlorinated rubber facing film at 16 adhered to a paper backing 17 from which the spot 15 is formed. It will be noted that the facing film is continuous and is present as a surface layer of substantially uniform thickness. The paper backing 17 may be of any suitable paper, express or kraft papers usually being employed. In the case of kraft or express papers, for example, it is desirable to impregnate the same so as to make the paper water-resistant and enhance flexibility as well as present a smooth film receiving surface. In Figure 4, there is illustrated a backing having an exaggerated thickness and provided with an impregnant 18.

A suitable impregnant for the paper, by way of example, consists of a suitably bodied linseed oil, a solvent such as Varnolene or high test gasoline, and a varnish drier. The paper so impregnated is festooned for a sufficient time and at a temperature suitable to polymerize the oil and to dry the impregnant in the paper.

Thereafter, the chlorinated rubber solution is applied by any usual coating machine as shown in Figure 5 consisting of a tank 19 containing the solution 20, an applying roll 21 and feeding roll 22. A roll of paper 17 is fed through the rolls and provided on its undersurface with a film 16 of desired thickness. Satisfactory coating solutions are as follows:

Example I

| | Parts by weight |
|---|---|
| Chlorinated rubber | 56.0 |
| Ester gum (hard resin) | 12.5 |
| Paraffin | 1.5 |
| Plasticizer | 26.5 |
| Solvent | 160.0 |

Example II

| | Parts by weight |
|---|---|
| Chlorinated rubber | 420.0 |
| Alkyd resin (soft resin) | 145.0 |
| Staybelite resin | 85.0 |
| #10 (hard resin) | |
| Diamyl phthalate | 80.0 |
| Wax | 15.0 |
| Solvent | 2010.0 |

After the coating operation, the paper is dried by festooning or other suitable manner to unite the coating and produce a hard, flexible, non-tacky film.

It will be noted that the chlorinated rubber constitutes the major ingredient and that the hard resin is present in substantially lesser amount than the chlorinated rubber, while the plasticizer in each case is in substantially greater amount than said hard resin but in substantially lesser amount than the chlorinated rubber whereby a tough, hard but flexible sealing layer is formed.

In each of the examples, the plasticizer may consist wholly of one of the plasticizers above referred to or as in the case of Example 2, a mixture of plasticizers may be employed such as a resin e. g. the modified alkyd and another plasticizer e. g. one of chemical nature of which the diamyl phthalate is an example. In other words, the plasticizer may be composed wholly or in part of a soft resin.

The other side of the paper is now given a coating of any suitable thermoplastic adhesive such as well known in the art. If desired, this rear side of the paper is given an initial coating of casein or other suitable material to prevent the solvent of the thermoplastic cement from penetrating the backing and affecting the chlorinated rubber film. The paper is then cut into strips of a size suitable for use in the usual spot or overall liner forming and applying machinery.

This application is a continuation in part of our co-pending application Serial No. 262,988, allowed November 24, 1941.

We claim:

1. A cap having a cushion liner and a facing thereon characterized by freedom from cracking and imperviousness to gases, said facing including a continuous film composed of chlorinated rubber as its major ingredient, a hard resin in substantially lesser amount than the chlorinated rubber and effective to toughen and harden the film and a plasticizer in substantially greater amount than said resin but in substantially lesser amount than said chlorinated rubber and effective to maintain the hard, tough rubber-resin film flexible and resistant to cracking under sealing compression.

2. A cap having a cushion liner and a facing thereon characterized by freedom from cracking and imperviousness to gases, said facing including a continuous film composed of chlorinated rubber as its major ingredient, a hard resin in substantially lesser amount than the chlorinated rubber and effective to toughen and harden the film and a plasticizer in substantially greater amount than said resin but in substantially lesser amount than said chlorinated rubber and effective to maintain the hard, tough rubber-resin film flexible and resistant to cracking under sealing compression, said plasticizer being composed at least in part of soft resin.

CHARLES E. McMANUS.
GILES B. COOKE.
VICTOR A. RYAN.